US009075775B2

(12) United States Patent
Greenfield et al.

(10) Patent No.: US 9,075,775 B2
(45) Date of Patent: Jul. 7, 2015

(54) METHOD AND SYSTEM OF IDENTIFYING TEXTUAL PASSAGES THAT AFFECT DOCUMENT LENGTH

(75) Inventors: Stephen Michael Greenfield, Glendale, CA (US); Christopher Neal Huntley, Glendale, CA (US)

(73) Assignee: WRITE BROTHERS, INC., Burbank, CA (US)

( * ) Notice: Subject to any disclaimer, the term of this patent is extended or adjusted under 35 U.S.C. 154(b) by 290 days.

(21) Appl. No.: 13/491,552

(22) Filed: Jun. 7, 2012

(65) Prior Publication Data
US 2012/0246560 A1 Sep. 27, 2012

Related U.S. Application Data

(63) Continuation of application No. 12/541,816, filed on Aug. 14, 2009, now Pat. No. 8,214,736.

(60) Provisional application No. 61/089,436, filed on Aug. 15, 2008.

(51) Int. Cl.
*G06F 17/00* (2006.01)
*G06F 17/21* (2006.01)

(52) U.S. Cl.
CPC ........... *G06F 17/211* (2013.01); *G06F 17/217* (2013.01)

(58) Field of Classification Search
CPC ... G06F 17/217; G06F 17/212; G06F 17/211; G06F 17/21; G06F 17/27; G06F 17/3089; G06F 2212/652
USPC ................................................ 715/251, 252
See application file for complete search history.

(56) References Cited

U.S. PATENT DOCUMENTS

| 3,701,972 | A | | 10/1972 | Berkley et al. ............... 710/36 |
|---|---|---|---|---|
| 4,509,138 | A | * | 4/1985 | Hayashi et al. ............. 715/201 |
| 4,881,197 | A | * | 11/1989 | Fischer ........................ 715/234 |
| 5,809,266 | A | * | 9/1998 | Touma et al. ................ 715/764 |
| 5,956,737 | A | * | 9/1999 | King et al. ................... 715/202 |
| 6,177,933 | B1 | * | 1/2001 | Young .......................... 715/805 |
| 6,947,959 | B1 | | 9/2005 | Gill .............................. 715/202 |
| 7,213,203 | B2 | | 5/2007 | Dunietz et al. ............... 715/251 |
| 7,512,879 | B2 | | 3/2009 | Weil et al. .................... 715/251 |
| 7,599,938 | B1 | | 10/2009 | Harrison, Jr. ............... 705/7.29 |
| 7,647,553 | B2 | | 1/2010 | Mogilevsky et al. ........ 715/247 |
| 7,797,622 | B2 | | 9/2010 | Dajean et al. ................ 715/231 |
| 7,895,243 | B1 | | 2/2011 | Baer et al. .................... 707/805 |
| 7,921,360 | B1 | * | 4/2011 | Sundermeyer et al. ...... 715/255 |
| 7,934,150 | B1 | | 4/2011 | Szonn et al. ................. 715/221 |
| 8,724,140 | B2 | * | 5/2014 | Tolomei et al. ............. 358/1.15 |
| 2003/0042666 | A1 | * | 3/2003 | Stevens ....................... 271/9.02 |
| 2003/0160975 | A1 | | 8/2003 | Skurdal et al. ............... 358/1.2 |
| 2004/0133542 | A1 | * | 7/2004 | Doerksen et al. ............... 707/1 |
| 2004/0145593 | A1 | | 7/2004 | Berkner et al. .............. 345/619 |
| 2004/0199867 | A1 | | 10/2004 | Brandengorg ............ 715/500.1 |

(Continued)

OTHER PUBLICATIONS

Gibson, John, et al. "Adaptive Web-Page Content Identification", Nov. 2007: WIDM '07: Processing of the 9th Annual International Workshop on Web Information and Data Management, pp. 105-112.

*Primary Examiner* — Laurie Ries (74) *Attorney, Agent, or Firm* — Arent Fox LLP; J.D. Harriman (57) ABSTRACT

The system relates to identifying critical textual passages that influence the pagination of electronic documents such that the addition or removal of text to these critical passages will have the effect of shortening or lengthening the document.

2 Claims, 6 Drawing Sheets

Perform Analysis

(56) References Cited

U.S. PATENT DOCUMENTS

| | | | |
|---|---|---|---|
| 2006/0053367 A1 | 3/2006 | Chen et al. | 715/513 |
| 2006/0080122 A1* | 4/2006 | Klopsch et al. | 705/1 |
| 2006/0206807 A1* | 9/2006 | Rosner et al. | 715/515 |
| 2006/0248440 A1 | 11/2006 | Rhoads et al. | 715/500 |
| 2007/0053001 A1* | 3/2007 | Huntley et al. | 358/1.18 |
| 2007/0061716 A1 | 3/2007 | Kato | 715/530 |
| 2007/0079236 A1* | 4/2007 | Schrier et al. | 715/517 |
| 2007/0250618 A1* | 10/2007 | Hammond | 709/224 |
| 2007/0294230 A1 | 12/2007 | Sinel et al. | 707/3 |
| 2008/0139191 A1 | 6/2008 | Melnyk et al. | 455/419 |
| 2008/0168342 A1 | 7/2008 | Shur et al. | 715/229 |
| 2008/0295005 A1 | 11/2008 | Salesin et al. | 715/763 |
| 2009/0122652 A1 | 5/2009 | Parees et al. | 368/10 |
| 2009/0254522 A1* | 10/2009 | Chaudhuri et al. | 707/3 |

\* cited by examiner

Fig. 3 — Single Pass Analysis

Fig. 4 — Perform Analysis

Fig. 5 — Multi-Pass Analysis

Fig. 6 — Recursively Try Suggestions

METHOD AND SYSTEM OF IDENTIFYING TEXTUAL PASSAGES THAT AFFECT DOCUMENT LENGTH

This application is a continuation of U.S. application Ser, No. 12/541,816, filed Aug, 14, 2009, the entire content of which is incorporated herein by reference, Also this patent application claims priority to U.S. Provisional Patent Application No. 61/089,436 filed on Aug. 15, 2008 and incorporated herein in its entirety.

TECHNICAL FIELD

The system relates to identifying critical textual passages that influence the pagination of electronic documents such that the addition or removal of text to these critical passages will have the effect of shortening or lengthening the document.

BACKGROUND OF THE SYSTEM

In the entertainment arts (movies, television, theatrical plays) authors of documents often face a dilemma when turning in their written work: they need to fit their documents into a prescribed length. For example, the typical screenplay for a motion picture is expected to be approximately 120 pages, roughly one page per minute of screen time. Turning in a screenplay that is longer, even by a few pages, can cause a screenplay to be rejected or worse—not even read. Conversely, scripts that are below 80 pages are generally considered too short to be accepted as a theatrical feature.

For television scripts, each section of a script often has to be a prescribed length due to commercial breaks, as well as fitting into the maximum airtime allocated for a show. This means there are multiple sections within a single document where adhering to specific page goals is mandatory.

The inverse of the problem also exists: writers often need to enhance material by adding additional text to exiting material, but don't wish to do so at the expense of increasing total page length.

However, most screenwriters understand that the long held tradition of one page equaling one minute of screen time is highly variable. The actual running time is strongly linked to both the style of the writer and the content of what is being written. So writers have evolved methods of adjusting their scripts—making long scripts appear shorter and short scripts appear longer.

Numerous techniques have existed since the early days of writing, mostly involving outright deceitful manipulation of a document: changing the final page number, doubling page numbers, printing onto lighter 16 pound paper instead of the traditional 20 pound duplication bond. With the advent of computerized word processing in the early 1980's, writers developed more sophisticated techniques that were less detectable: they were able to change the point size of a font, shave points off the line height, and adjust the formatting of margins. Collectively these techniques are known as "cheating the script."

However, as the general population became more familiar with computerized word processing, it became simple for the average reader to recognize that a screenplay, teleplay or stage play did not fit the rigors of the prescribed format. Thus, it became necessary to solve this problem with a different approach.

The technique for honestly adjusting page count is simply to add to or remove from the existing material. For example, a common approach to decreasing page count is to look though the document to find paragraphs that have a short last line, in the hope that these paragraphs will be the easiest to edit and thus a line may be saved. Save enough lines and a few pages might be saved.

Prior art has focused on the manipulation of formatting, versus the editing of content. "Dynamic Page Reduction" (Horton 5,835,920) describes "a method for reducing a page to accommodate "orphan" or "dangling" lines which continue on a subsequent page." The spatial reduction methods described in the patent deal with spacing and formatting, using the automatic reduction of point size and line height as methods to fit the text of a telephone billing statement onto fewer pages.

Most general word processors have the capability of globally changing document styles. By using such features to change margins, line height, font size, and global paper size, users have been able to manipulate document length. Specialized word processors, such as the software tool, Movie Magic Screenwriter (1995), contain features for further automating page reduction by allowing global reduction of line heights of blank lines. However, all these methods of manipulating formatting parameters, known as "cheating", have become detectable and are no longer acceptable.

However, there is a complication that makes this approach haphazard. There are complex rules that affect the pagination of technical documents such as entertainment scripts, and these rules limit the number of available locations where page breaks may occur. For example, the deletion of hundreds of lines in a long 125 page document might have no effect on page count. However, in the same document, a single word might be shortened on, for example, page 11, leading to a significant (1-3 page) downstream decrease in page count by the time page 125 is reached. We refer to this as the "chaos of pagination."

Because of this problem, writers often spend a great deal of time manually making changes to see if the changes achieve the desired result.

BRIEF SUMMARY OF THE SYSTEM

Summary of the Invention

The invention comprises a computer-based system for identifying critical textual passages that influence the pagination of electronic documents such that the addition or removal of text to these critical passages will have the effect of shortening or lengthening the document.

In one or more embodiments, the document may be a screenplay, a stage play, a teleplay, an Audio-Video script, a novel, or a book. However, any desired textual format of any length may be submitted for analysis.

In one or more embodiments, the critical textual passages are a series of contiguous characters, which may be a portion of a word, a sentence, a paragraph, or a series of paragraphs.

In one or more embodiments, the electronic document is analyzed using a method that determines the effect that adding characters to or removing characters from a specific portion of text will have. The method applies a test that temporarily changes the document. For example, a word may be removed from a sentence. However, different tests may add or remove more or less text in order to identify critical textual passages.

The system may be configured by the user to select which test methods will be used for analysis.

In one or more embodiments, a method can be applied where the text is restructured or rewritten, for example in an active or a passive voice, so that the effect of shortening or lengthening of a textual passage can be measured.

In one or more embodiments, repetitive words or phrases may be iteratively lengthened or shortened in order to determine if doing so for the entire document will have an effect. For example, the names of characters in a story may be iteratively lengthened or shortened; testing the name "Stephen" with this method may reveal that shortening by two letters will result in reducing the page count by three pages. The user may use this information to change the name to "Steve", or select an entirely different name.

In one or more embodiments, paragraphs may be combined or split in order to determine if doing so will affect document length.

In one or more embodiments, the document is repaginated after each change in order to determine the effect that individual change has had. However, it is also possible to pre-calculate and store the value of each individual change, thus avoiding repetitive repagination.

In one or more embodiments, the effect a change has or will have is measured by how many page breaks are affected by the change, as well as well as how many pages, fractions of pages, lines or characters are gained or lost by each change.

In one or more embodiments, the document is returned to its pre-changed state after each change is made and its effect has been determined. This allows another test to be made against the same original text. A typical approach to reverting the text may be to use the native capability of the word processing software to "undo" changes. However, a similar effect can be obtained by simply making a copy of the text being analyzed and performing the change on the copy.

The results of making a "pass" over the desired text and applying these test methods identifies the critical textual passages, if any, that influence pagination, and are referred to as "suggestions."

In one or more embodiments, these suggestions from a single pass may be submitted for further processing, In this multi-pass embodiment, each suggestion is automatically enacted as if the user had changed the document themselves, but instead of reverting the document the change is retained and a new, uniquely identifiable single pass is made on the changed document. The resulting suggestions of this pass are either presented to the user or submitted for further processing. By applying this iterative hierarchical multi-pass method, complex combinations of individual changes can be Suggestions are collected during textual analysis and presented to the user. In one embodiment, the suggestions are presented in a list ranked by how much the document will be lengthened or shortened if the user enacted the change represented by the suggestion. However, the user can sort the suggestions by different parameters of analysis. For example, the user may sort by total document page count changed, number of page breaks changed, method of change, or location of change in the document.

In one or more embodiments, words that are suggested for shortening or lengthening may be automatically submitted to a thesaurus, and a list of synonyms returned so that the user can quickly enact the suggestion.

In one or more embodiments, the suggestions are presented in a form that facilitates enacting them. For example, upon selecting a suggestion, the user is shown the text the suggestion applies to as that text appears in the document, and then given the opportunity to either enact the change by pressing a button (for example, "delete word") or to manually edit the text in that area of the document. The user may also elect to do nothing and ignore the suggestion.

DETAILED DESCRIPTION OF THE INVENTION

A method and apparatus for identifying critical textual passages that influence the pagination of electronic documents such that the addition or removal of text to these critical passages will have the effect of shortening or lengthening the document is described. In the following description, numerous specific details are set forth to provide a more thorough description of the invention. It will be apparent, however, to one skilled in the art, that the invention may be practiced without these specific details. In other instances, well-known features have not been described so as not to obscure the invention. The system can be implemented as software on a computer system.

The process begins when the user, having selected various analysis options and a range of text to analyze, instructs the software to begin scanning.

In one embodiment, a document is created which follows a certain set of formatting rules or style requirements. For example, for a screenplay or the like, the document may meet certain font size, type, and pitch, line spacing, page break rules, etc. For purposes of this example, it is assumed the completed draft of the document is of a length (number of pages) that is not desired (too few or too many). The system is then applied to the document to determine if the page number problem can be resolved or improved.

Figure 3:
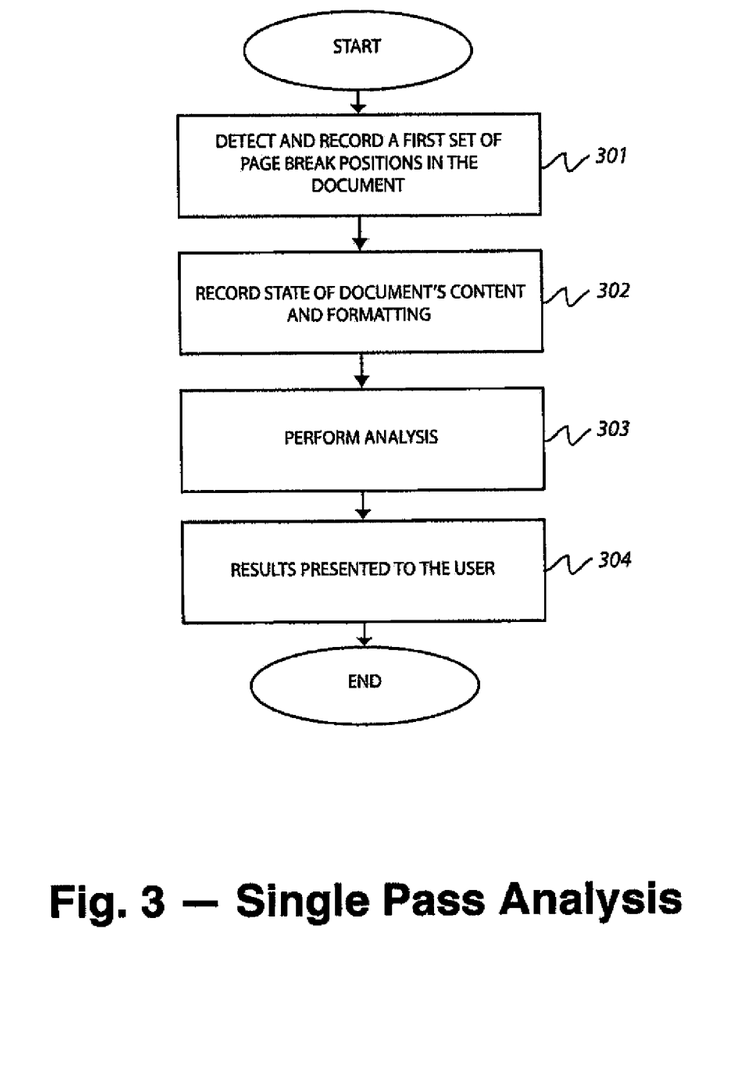
FIG. 3 is a flow diagram of the single-pass analysis of a document

Referring to FIG. 3, in order to determine if a change will affect document length, we must first determine 301 where the page breaks are currently located in the document 101. This is accomplished by iterating through the document and recording which paragraphs are located on either side of each page break. The collection of these records is referred to as the Reference Page Break State Array, The state of the document's content and formatting is recorded 302 such that destructive tests can be performed on the document and still have the document returned to its original pre-tested state for additional tests and at the completion of testing. In one or more embodiments, the native undo capability of the word processing software may be utilized to record the original state and revert back to that state. However, a similar effect can be obtained by simply making a copy of the text being analyzed and performing the change on the copy.

At step 303, the document is analyzed using certain possible changes or modifications using test methods determined by the user and/or suggested by the system itself. At step 304 the results of the analysis are presented to the user.

Figure 4:
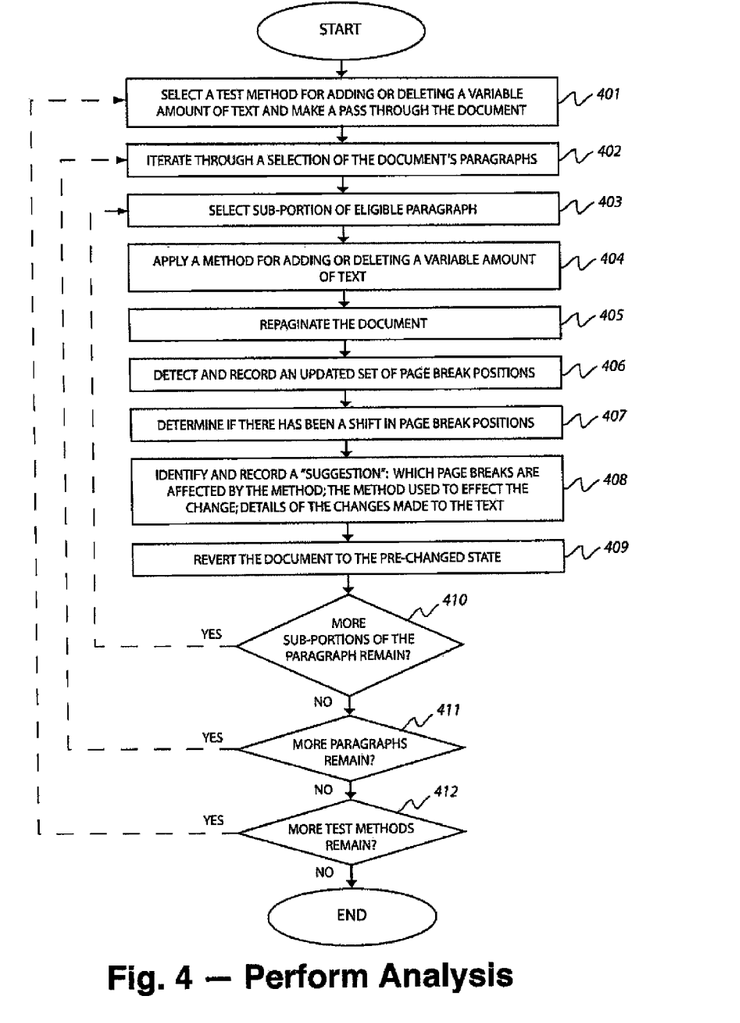
FIG. 4 is a flow diagram of the process of performing the actual analysis

The analysis of the document or desired text from the document of step 303 is described in FIG. 4. A test method is chosen 401 from a list of methods that have been either user-selected or are determined by the system to be appropriate for the type of document being analyzed. Some examples of test methods include deletion of words, addition or deletion of characters, deletion or addition of lines to a paragraph, removal of entire paragraph or paragraphs, combination of two paragraphs, restructuring or rewriting text, and iteratively lengthening or shortening repetitive phrases.

Test methods may be performed serially, each making a separate unique pass through the document text, or they may be performed in parallel, or in combination. In one embodiment, some tests are performed during separate passes through the document text, while others are performed together. For the sake of example, FIG. 4 shows test methods being performed serially.

Analysis begins by iterating 402 through the document and selecting the next eligible paragraph of text. Eligibility is determined by the various analysis options the user has selected. By way of example, if the user has desired to analyze only a specific page in the document, then analysis will only include paragraphs from that page. Also, specific test methods may require or exclude different paragraph styles from analysis.

A sub-portion of the eligible paragraph 402 being tested is then selected 403. Different test methods may select varying amounts of text for testing. The process of 403 insures that all the text of the eligible paragraph has been examined. For example, a method that tests the deletion of words will test all the words in a paragraph, beginning with the first word.

The selected test method 401 is applied to the selected sub-portion of text 403 by adding characters to or removing characters from that sub-portion 404. By way of example, if a word was selected in 403, by a test method 401 designed to test the deletion of words, then the word is removed from the paragraph at step 404.

The document is then repaginated at step 405 using the same set of rules used to paginate the document prior to analysis.

An updated Page Break Array is built 406, either by further analysis or as a by-product of the pagination process. In the preferred embodiment the new Page Break Array is constructed during the pagination process. This method has the added advantage that allows the time-consuming pagination process to stop as soon as page break changes are no longer detected.

The location of any shifts in page break positions can be determined 407 by comparing the records of the newly constructed Page Break Array with those in the Reference Page Break Array.

If there are any shifts in page break position, they are identified and recorded 408 in an array of results which tracks the starting and ending page of the shift, the method used to effect the change, and any relevant details that describe the change. Each such record is referred to herein as a "suggestion", and is saved at step 408 for later presentation to the user.

A further method may be applied to refine the result of any specific change method. If a particular sequence of characters that has been added or removed is shown to affect page break positions, then additional characters may be added or removed at that same location in order to determine the maximum number of characters that may be added or removed in order to have the same effect. By way of example, if deleting a six-letter word from a paragraph is shown to affect the following two page break positions, then an attempt may be made to iteratively test the deletion of the trailing characters of that word, starting with the last 1 character and progressing through the last 5 characters, or until the same effect of two page break position changes has been achieved. Thus a more exact critical text passage can be identified.

The document is then reverted at step 409 to its pre-changed state, by employing the native undo capability of the word processing system, or by restoring the test workspace to a copy of the pre-changed document, or by restoring the original paragraph that was destructively tested.

If more sub-portions of the paragraph remain at step 410 to be analyzed, then the process continues by selecting the next sub-portion of the paragraph 403. If not, the system proceeds to step 411.

If more paragraphs remain 411 to be analyzed, then the process continues by selecting the next eligible paragraph 402. If no more paragraphs remain to analyze, then the system checks at step 412 if there are more test methods to apply.

If more test methods remain 412 to be utilized, then the next test method is selected 401. Otherwise, the analysis is complete.

The collected suggestions of 408 are sorted and filtered based on user preferences, and then ranked according to the strength of how easily a suggestion can be enacted by the user combined with the amount of page breaks or pages affected by the change. The list of ranked suggestions is then presented to the user FIG. 3 at step 304.

Figure 5:
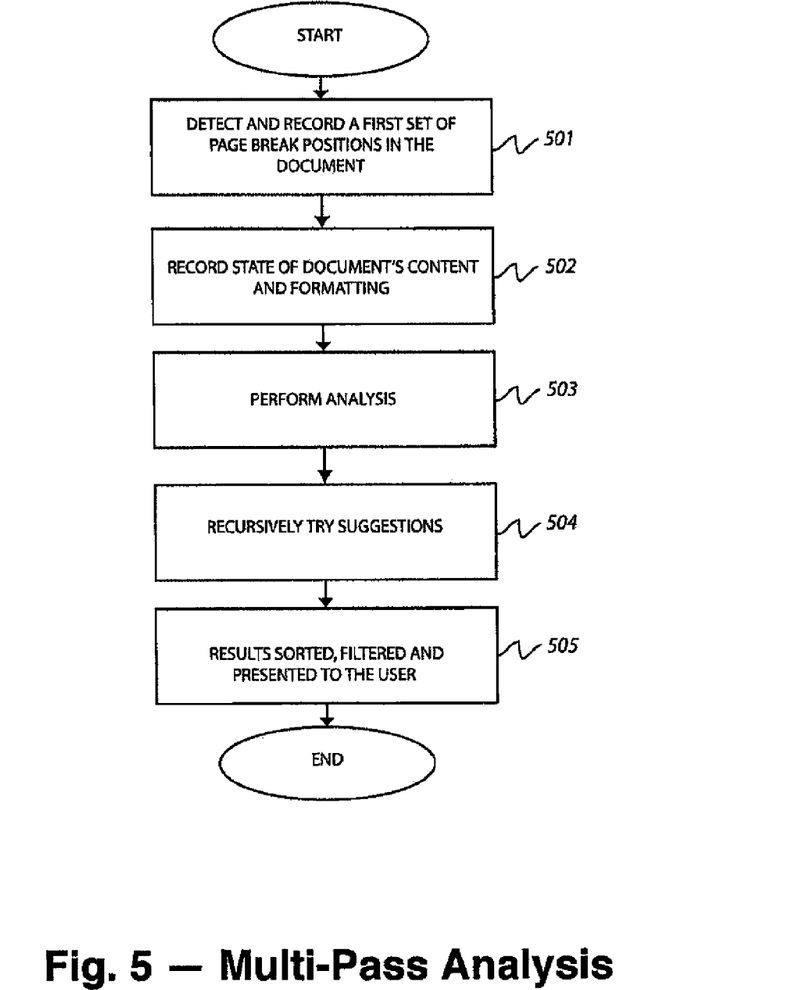
FIG. 5 is a flow diagram of the multi-pass analysis of a document.

An alternate embodiment is shown in FIG. 5. The entire process of performing the analysis 503 of a document or a portion of a document described in FIG. 4 is itself applied iteratively and recursively to top-ranking suggestions to create a hierarchical tree of results. The suggestions are enacted on the document text as if the user had actually made them, then the text is re-analyzed to extract a new set of suggestions. The process can continue to any desired depth. This form of multi-pass analysis can discover complex multiple-step changes that can lead the user to more quickly reach their desired page count.

Referring to FIG. 5, the first three steps are similar to (or may be the same as) the, single pass analysis described in FIG. 3. A Reference Page Break State Array is created 501, and the state of the document's content and formatting are recorded 502. In 503, the single-pass analysis such as described in FIG. 4 is performed, generating a list of suggestions.

All the operations performed are during this process are considered temporary in one embodiment. Upon completion of the analysis process, the state of the document is returned to the original pre-tested state, unchanged by any of the destructive tests described below.

These first set of suggestions are passed to a process to recursively try the suggestions 504. Recursion allows the nested, hierarchical processing of data using a single algorithm. This recursive process is detailed in FIG. 6.

When speaking of recursion it is common to refer to the depth, or number of levels, that the algorithm is permitted to recluse or call itself. Level is typically an integer number greater than 0. If not limited by a maximum level, the use of recursion might continue for so long as to make the analysis process impractical. In the embodiment presented below, we refer to level as a single instance of the recursive procedure, and maximum level as the maximum recursions we will permit. Maximum level in this embodiment is meant as a limit to prevent the generation of more suggestions than the user desires.

Figure 6:
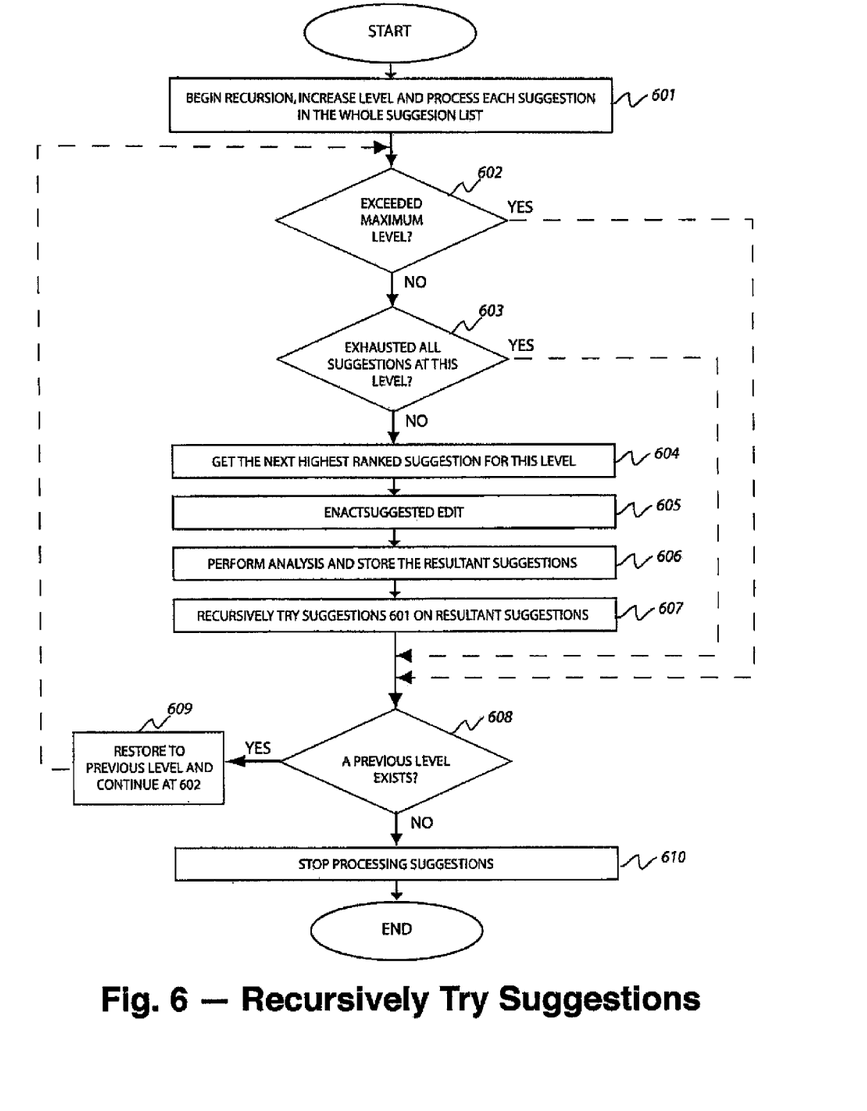
FIG. 6 is a flow diagram of the recursive process used to support multi-pass analysis.

In FIG. 6 step 601, recursion begins, increasing the level by 1, and each suggestion in the suggestion list submitted to this at this level will be analyzed.

If by increasing our level we have reached the maximum level allowed 602, then we must stop processing and return to the previous level, if a previous level exists 608.

Otherwise, we need to test if we have examined all the suggestions for the current level 603. If we have, then we must stop processing and return to the previous level, if a previous level exists 608.

Otherwise, we have a valid suggestion to analyze. In 604 the next highest ranked suggestion is obtained.

The suggested edit is obtained from the suggestion record and enacted 605. This entails making the change to the document text that was suggested during analysis at FIG. 4, 408. For example, if the suggestion was to delete a word in order to affect page length, then that word is deleted. No attempt is made to correct the grammar of the text to adjust for making the suggestion, Similarly, if a suggestion calls for deleting an entire sentence, no attempt is made to adjust the meaning of the document to account for that missing sentence.

The document is submitted to single-pass analysis 606, as describe in FIG. 4. This generates a list of suggestions, which are stored in computer memory.

These suggestions are now passed 607 to the recursive process 601.

When the recursive process has either reached a maximum level or exhausted all of the suggestions for that level, the recursive processed continues at 608.

If a previous level exists 608, then the previous level and that level's suggestions are restored 609 and processing of that level's suggestions continue 602.

Otherwise, there are no more suggestions from 503 to process from the top (first) level, and the recursive process is finally stopped 610.

Results are now sorted, filtered and presented to the user 505.

The present invention identifies critical textual passages that affect pagination of all paragraphs in the entire document, based on content editing operations that a user might perform.

EXAMPLE EMBODIMENT OF APPARATUS

Figure 1:
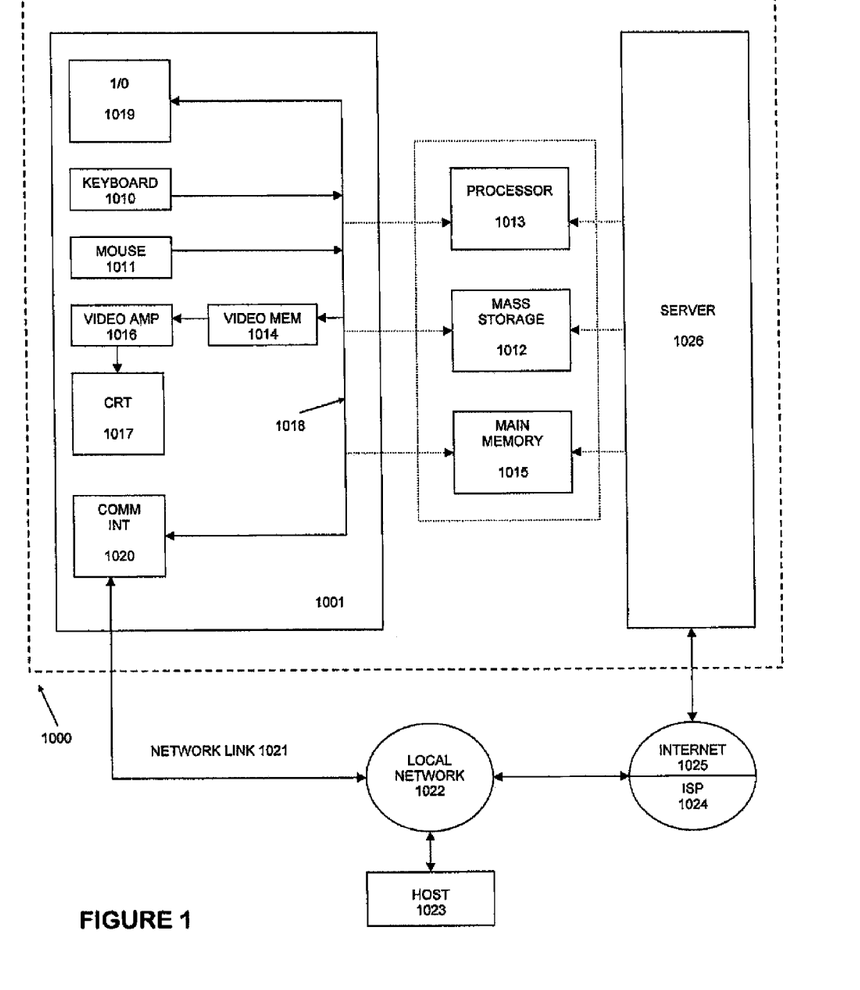
FIG. 1 is an example computer environment for implementing the system.
Figure 2:
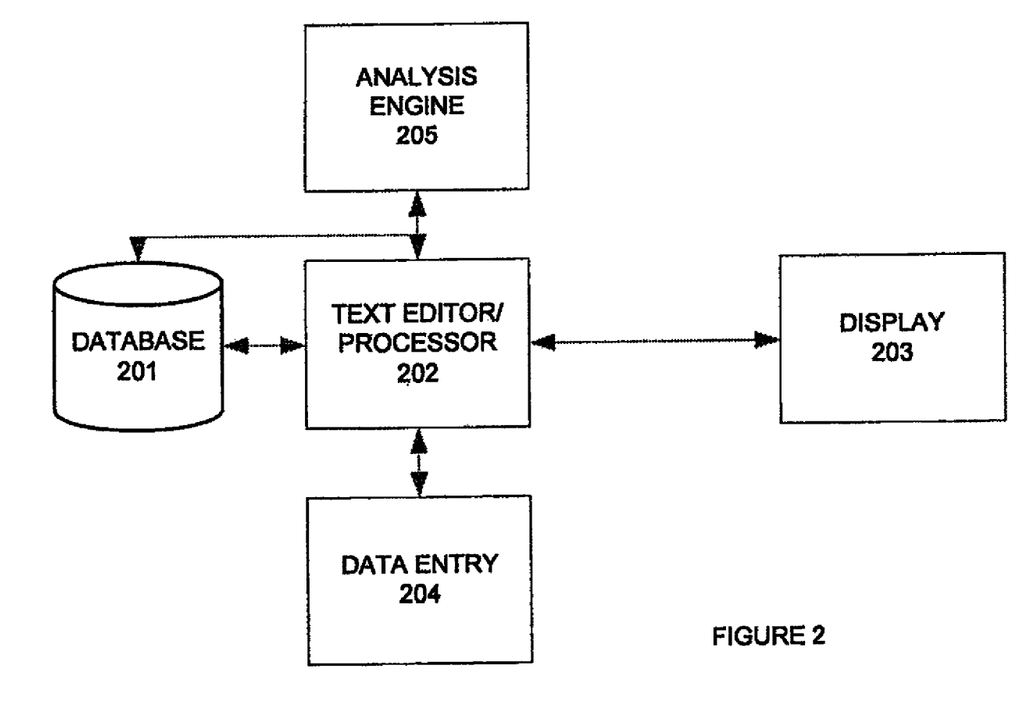
FIG. 2 is a diagram illustrating an embodiment of the apparatus of the system.

FIG. 2 is an example of an embodiment of the apparatus of the system. A database 201 stores files and documents that for use with the system. A text editor/processor 202 is coupled to the database 201 and to a display 203. Data entry 204 permits a user to create, upload, modify, and edit documents for use by the system. Analysis/test. engine 205 is coupled to the database 201 and text editor/processor 202. The analysis/test engine 205 provides options for manipulating page length of the document and for permitting a user to select possible tests to apply to a document. The engine 205 then applies the test and determines and displays the effect on the document to the user. The engine 205 can maintain one or more copies of the document being reviewed and store copies of the document in the database 201.

Embodiment of Computer Execution Environment (Hardware)

An embodiment of the system can be implemented as computer software in the form of computer readable program code executed in a general purpose computing environment such as environment 1000 illustrated in FIG. 10, or in the form of bytecode class files executable within a Java.™. run time environment running in such an environment, or in the form of bytecodes running on a processor (or devices enabled to process bytecodes) existing in a distributed environment (e.g., one or more processors on a network). A keyboard 1010 and mouse 1011 are coupled to a system bus 1018. The keyboard and mouse are for introducing user input to the computer system and communicating that user input to central processing unit (CPU 1013. Other suitable input devices may be used in addition to, or in place of, the mouse 1011 and keyboard 1010. I/O (input/output) unit 1019 coupled to bi-directional system bus 1018 represents such I/O elements as a printer, A/V (audio/video) I/O, etc.

Computer 1001 may include a communication interface 1020 coupled to bus 1018. Communication interface 1020 provides a two-way data communication coupling via a network link 1021 to a local network 1022. For example, if communication interface 1020 is an integrated services digital network (ISDN) card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Wireless links are also possible. In any such implementation, communication interface 1020 sends and receives electrical, electromagnetic or optical signals which carry digital data streams representing various types of information.

Network link 1021 typically provides data communication through one or more networks to other data devices. For example, network link 1021 may provide a connection through local network 1022 to local server computer 1023 or to data equipment operated by ISP 1024. ISP 1024 in turn provides data communication services through the world wide packet data communication network now commonly referred to as the "Internet" 1025. Local network 1022 and Internet 1025 both use electrical, electromagnetic or optical signals which carry digital data streams. The signals through the various networks and the signals on network link 1021 and through communication interface 1020, which carry the digital data to and from computer 1000, are exemplary forms of carrier waves transporting the information.

Processor 1013 may reside wholly on client computer 1001 or wholly on server 1026 or processor 1013 may have its computational power distributed between computer 1001 and server 1026. Server 1026 symbolically is represented in FIG. 10 as one unit, but server 1026 can also be distributed between multiple "tiers". In one embodiment, server 1026 comprises a middle and back tier where application logic executes in the middle tier and persistent data is obtained in the back tier. In the case where processor 1013 resides wholly on server 1026, the results of the computations performed by processor 1013 are transmitted to computer 1001 via Internet 1025, Internet Service Provider (ISP) 1024, local network 1022 and communication interface 1020. In this way, computer 1001 is able to display the results of the computation to a user in the form of output.

Computer 1001 includes a video memory 1014, main memory 1015 and mass storage 1012, all coupled to bi-directional system bus 1018 along with keyboard 1010, mouse 1011 and processor 1013.

As with processor 1013, in various computing environments, main memory 1015 and mass storage 1012, can reside wholly on server 1026 or computer 1001, or they may be distributed between the two. Examples of systems where processor 1013, main memory 1015, and mass storage 1012 are distributed between computer 1001 and server 1026 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 1012 may include both fixed and removable media, such as magnetic, optical or magnetic optical storage systems or any other available mass storage technology. Bus 1018 may contain, for example, thirty-two address lines for addressing video memory 1014 or main memory 1015. The system bus 1018 also includes, for example, a 32-bit data bus for transferring data between and among the components, such as processor 1013, main memory 1015, video memory 1014 and mass storage 1012. Alternatively, multiplex data/address lines may be used instead of separate data and address lines.

In one embodiment of the invention, the processor 1013 is a microprocessor such as manufactured by Intel, AMD, Sun, etc. However, any other suitable microprocessor or microcomputer may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the cathode ray tube (CRT) raster monitor 1017. Video amplifier 1016 is well known in the art and may be implemented by any suitable apparatus. This circuitry converts pixel data stored in video memory 1014 to a raster signal suitable for use by monitor 1017. Monitor 1017 is a type of monitor suitable for displaying graphic images.

Computer 1001 can send messages and receive data, including program code, through the network(s), network link 1021, and communication interface 1020. In the Internet example, remote server computer 1026 might transmit a requested code for an application program through Internet 1025, ISP 1024, local network 1022 and communication interface 1020. The received code maybe executed by processor 1013 as it is received, and/or stored in mass storage 1012, or other non-volatile storage for later execution. In this manner, computer 1000 may obtain application code in the form of a carrier wave. Alternatively, remote server computer 1026 may execute applications using processor 1013, and utilize mass storage 1012, and/or video memory 1015. The results of the execution at server 1026 are then transmitted through Internet 1025, ISP 1024, local network 1022 and communication interface 1020. In this example, computer 1001 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

What is claimed is:

1. A method of analyzing a document comprising:
    in an analysis engine;
        determining a page count of the document and identifying each page break of the document in a reference page break array;
        identifying a desired page count of the document wherein the desired page count is based on a set of formatting rules;
        selecting a test method to apply to the document;
        applying the test method to the document;
        determining a new page count of the document and identifying each page break of the document in an updated page break array;
        determining if the new page count is the desired page count;
        applying a second test method if the new page count is not the desired page count.

2. The method of claim 1 wherein the document is formatted according to a specific requirement.

* * * * *